United States Patent
Reguzzi

(10) Patent No.: US 6,824,334 B2
(45) Date of Patent: Nov. 30, 2004

(54) DRIVING ASSEMBLY FOR DRIVING A PLURALITY OF MANDRELS

(76) Inventor: Luigi Reguzzi, Via S. Alessandro, 139/141, 22066 Mariano Comense (IT)

( * ) Notice: Subject to any disclaimer, the term of this patent is extended or adjusted under 35 U.S.C. 154(b) by 250 days.

(21) Appl. No.: 10/194,614

(22) Filed: Jul. 12, 2002

(65) Prior Publication Data

US 2003/0012612 A1 Jan. 16, 2003

(30) Foreign Application Priority Data

Jul. 13, 2001 (IT) .................................. MI2001A1509

(51) Int. Cl.⁷ .............................................. B23B 39/16
(52) U.S. Cl. .............................. 408/42; 408/46; 408/53
(58) Field of Search .......................... 408/42, 46, 53, 408/101, 129, 130, 132, 138

(56) References Cited

U.S. PATENT DOCUMENTS

| 2,590,283 A | * | 3/1952 | Weaver | 408/117 |
| 2,607,197 A | * | 8/1952 | Johnson | 91/189 R |
| 3,614,251 A | * | 10/1971 | Witzig et al. | 408/3 |
| 4,915,549 A | * | 4/1990 | Riddell | 408/43 |
| 5,277,523 A | * | 1/1994 | Jones | 408/14 |
| 6,412,156 B1 | * | 7/2002 | Yunokawa et al. | 29/53 |

FOREIGN PATENT DOCUMENTS

JP  02180513 A  *  7/1990  ........... B23B/39/16

* cited by examiner

Primary Examiner—Daniel W. Howell
(74) Attorney, Agent, or Firm—Hedman & Costigan, P.C.

(57) ABSTRACT

A driving assembly for driving a plurality of mandrels comprises a supporting carriage supporting a plurality of mandrels, adjoining one another along a parallel direction to the carriage driving direction, and clamping means for removably clamping the individual mandrels at a withdrawn position thereof, as well as driving means for driving the individual mandrels, which can be actuated as a mandrel is arranged at an advanced position.

6 Claims, 5 Drawing Sheets

DRIVING ASSEMBLY FOR DRIVING A PLURALITY OF MANDRELS

BACKGROUND OF THE INVENTION

The present invention relates to a driving assembly for driving a plurality of mandrels.

As is known, in a lot of industrial fields are conventionally used operating mandrels which are arranged in an adjoining relationship and are supported by a mandrel carriage which drives the mandrels on a workpiece to be machined.

In prior mandrel driving arrangements, the mandrels are actually driven independently from their contingent processing operations or requirements.

Accordingly, a comparatively amount of power is consumed, and the mandrel driving assembly generates a comparatively high amount of noise.

Another drawback is that a continuous driving of all the mandrels causes a quick mechanical wearing of the mandrels, thereby their rotary speed must be reduced, with a consequent less machining yield.

SUMMARY OF THE INVENTION

Accordingly, the aim of the present invention is to overcome the above mentioned problem, by providing a driving assembly for driving a plurality of mandrels, which allows to greatly reduce the usage of power necessary for either pneumatically or hydraulically driving said mandrels.

Within the scope of the above mentioned aim, a main object of the present invention is to provide such a mandrel driving assembly which operates practically noiseless, together with a less mechanical wearing, a greater rotary speed and, consequently, a larger yield.

Another object of the present invention is to provide such a mandrel driving assembly which allows the performance of simple maintenance operations of the mandrel, with a greater operating flexibility for driving the individual mandrels.

Another object of the present invention is to provide such a mandrel driving assembly which is very reliable and safe in operation.

Yet another object of the present invention is to provide such a mandrel driving assembly which can be easily made starting from easily available elements and materials and which, moreover, is very competitive from a mere economic standpoint.

According to one aspect of the present invention, the above mentioned aim and objects, as well as yet other objects, which will become more apparent hereinafter, are achieved by a driving assembly for driving a plurality of mandrels, comprising a carriage supporting a plurality of mandrels, arranged in an adjoining relationship along directions substantially parallel to a driving direction of said carriage, characterized in that said assembly comprises clamping means for removably clamping, at a withdrawn position, individual mandrels, and driving means for driving said individual mandrels, said driving means being actuated as the mandrel is arranged at an advanced position.

BRIEF DESCRIPTION OF THE DRAWINGS

Further characteristics and advantages of the present invention will become more apparent hereinafter from the following detailed disclosure of a preferred, though not exclusive, embodiment of a driving assembly for driving a plurality of mandrels, being illustrated, by way of an indicative, but not limitative, example, in the accompanying drawings, where.

DESCRIPTION OF THE PREFERRED EMBODIMENTS

Figure 1:
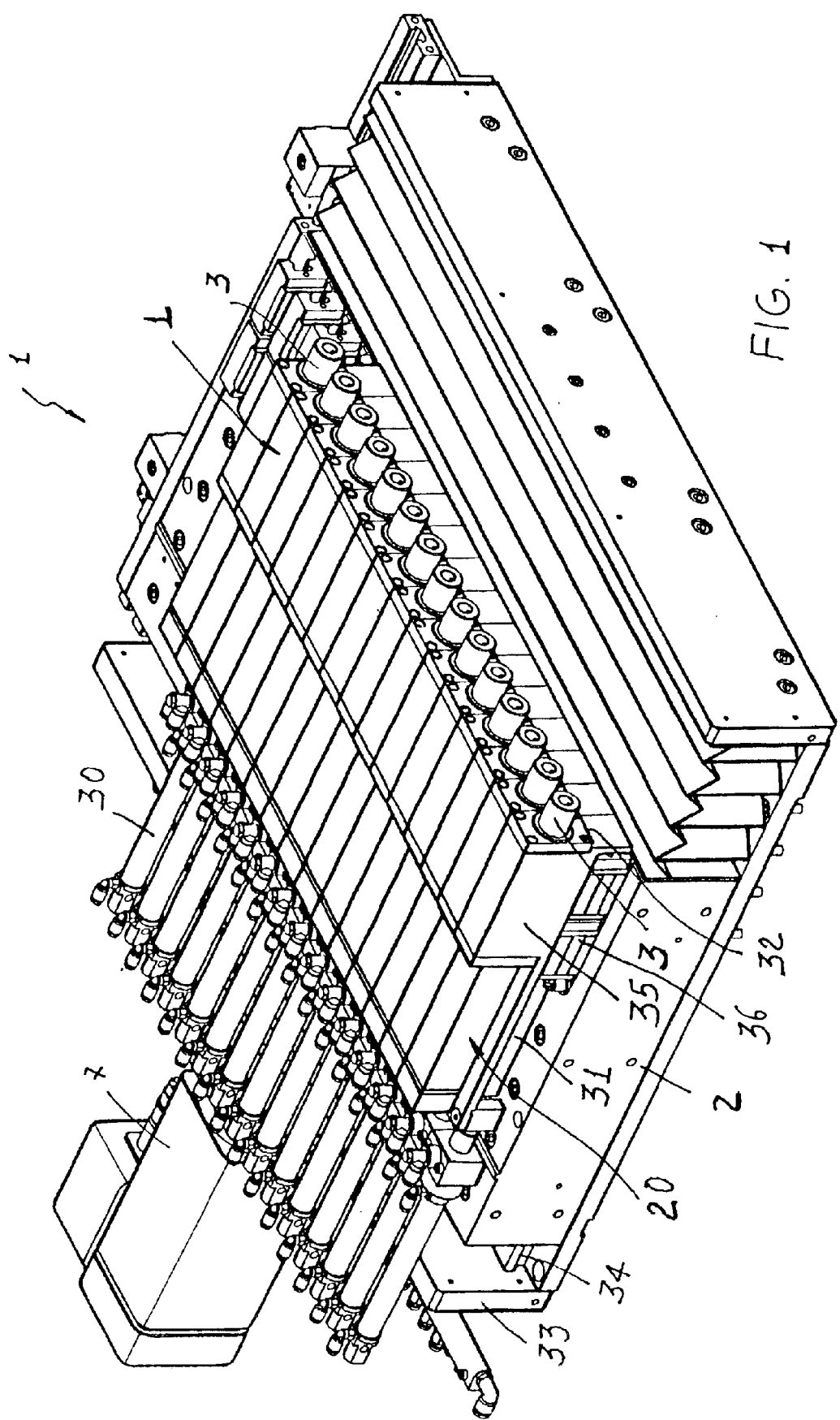
FIG. 1 is a schematic perspective view illustrating the mandrel driving assembly according to the present invention, according to a first embodiment thereof.

With reference to the number references of FIG. 1, the driving assembly for driving a plurality of mandrels 3 according to the present invention, which has been generally indicated by the reference number 1, comprises a mandrel supporting carriage 2, supporting a plurality of mandrels 3, which can be either hydraulically or pneumatically driven, and which are arranged in an adjoining relationship along directions substantially parallel to the supporting carriage 2 driving direction.

The supporting carriage 2, in particular, is driven by a worm screw 6, which is rotatively driven by a feeding driving motor 7.

The main feature of the invention is that each mandrel 3 can be driven in a selective and independent manner from the other mandrels.

The mandrel driving is controlled by fixed-stroke pneumatic selecting cylinders 30 which are designed for locking their piston rods 31 at their end of stroke or limit positions.

The selection of the mandrels 3 to be used is performed by causing the corresponding pneumatic cylinders 30 to be fed, said pneumatic cylinders 30 including, as stated, respective piston rods 31.

During the feeding operation, each cylinder 30, as preselected, causes the displacement of a corresponding slidable support element 35 along the guides 36 of the mandrels 3 which, accordingly, will be caused to project frontward, with respect to the not selected mandrels 3. Said mandrels 3 are driven independently from one another by brushless motors 20.

Accordingly, it is possible to operate only the electric motors 20 of the selected mandrels 3, with a great power saving.

The sliding of the above mentioned elements is performed on the supporting carriage 2.

The carriage 2, in turn, as the mandrel driving assembly for driving the mandrels is operated, is caused to advance by a worm screw 6, driven by a motor reducing unit 7, supported by a supporting shoulder 33.

As shown, the mentioned worm screw 6 is engaged with a corresponding female thread, formed on the rear surface of the carriage 2.

At the end of each drilling and/or milling operation, the driving assembly can perform a reciprocating rectilinear movement along suitably provided guides 34.

FIGS. 2, 3, 4 and 5 show a second embodiment of the driving assembly for independently driving a plurality of mandrels 3.

This embodiment also provides to use a supporting carriage 2 which can slide along guides 25.

This supporting carriage supports a plurality of said mandrels 3, arranged adjoining one another and adapted to slide along directions substantially parallel to the supporting carriage 2 driving direction.

The supporting carriage 2, in particular, is driven by the mentioned worm screw 6, driven by said motor reducing unit 7 for sliding along the side guides 25.

The supporting carriage 2 supports, in turn, a plurality of mutually independent mandrels, which can slide on support element or bushes 21 rigid with the supporting carriage 2, and adapted to be latched or locked, by the latching tooth 12 and counter-tooth 13 to a fixed wall 22 on which said motor reducing unit 7 is applied.

Said wall 22 comprises a hole in which said worm screw 6 is engaged, said worm screw 6 being associated with a hook element 13 which is provided for engaging with a clamping spike element 11 having a tooth shaped end portion 12.

Figure 2:
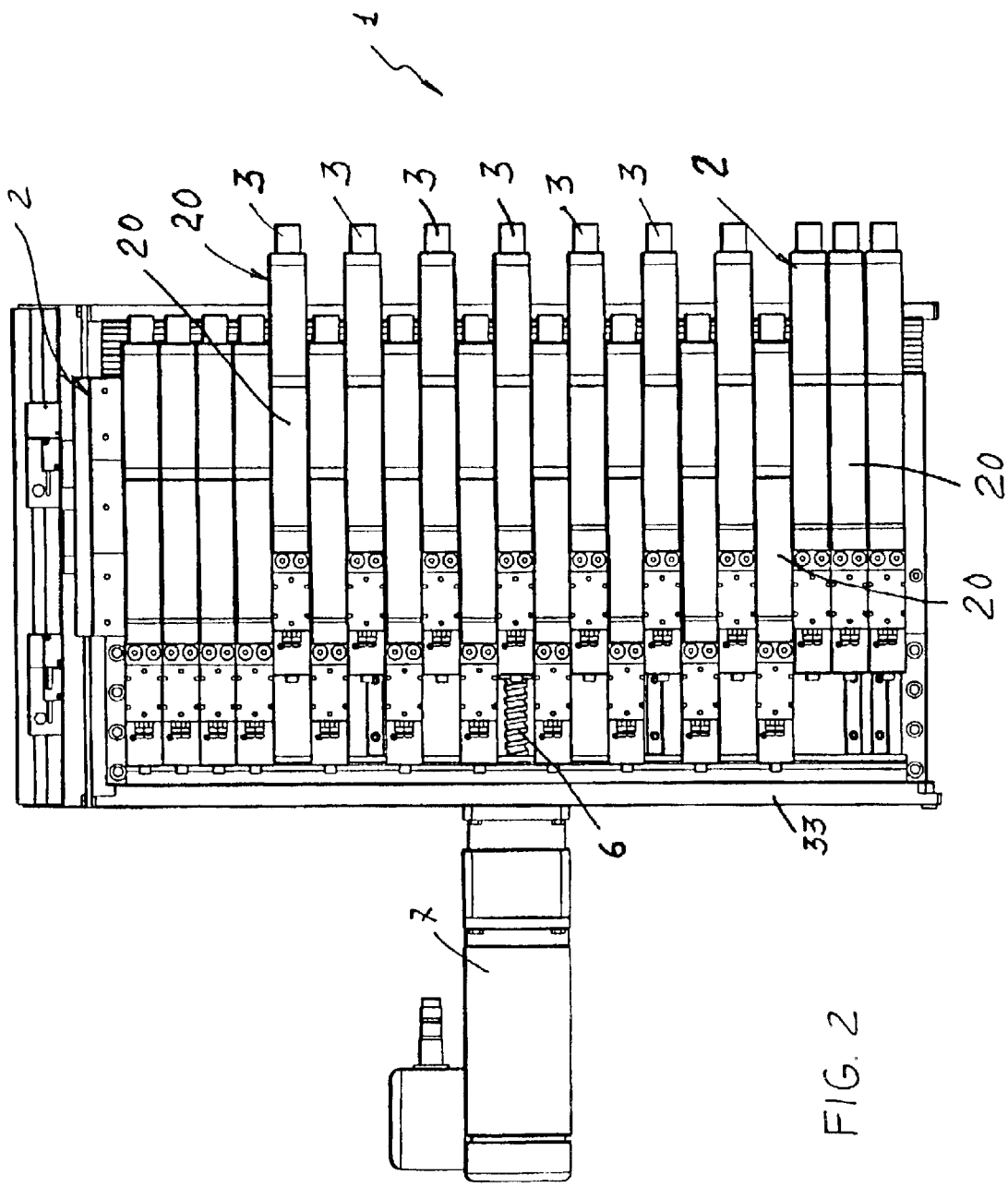
FIG. 2 is a top plan view of a second embodiment of the mandrel driving assembly according to the present invention, some mandrels of which are actuated.

As is clearly shown in FIG. 2, the supporting carriage supports a plurality of mandrels 3, each of which comprises a brushless motor 20. Each mandrel 3 is thereby selectively driven, independently from the other mandrels.

In order to provide the above mentioned driving, a plurality of clamping means are provided for removably clamping, at a withdrawn position, the individual mandrels, generally indicated by the reference number 10, which comprises each a locking spike element, swingably mounted on the mandrel body and including a hook element 12 removably engaging with a counter-hook element 13 in turn mounted on the fixed wall 22 applied to the support 26 of the carriage 2.

Figure 3:
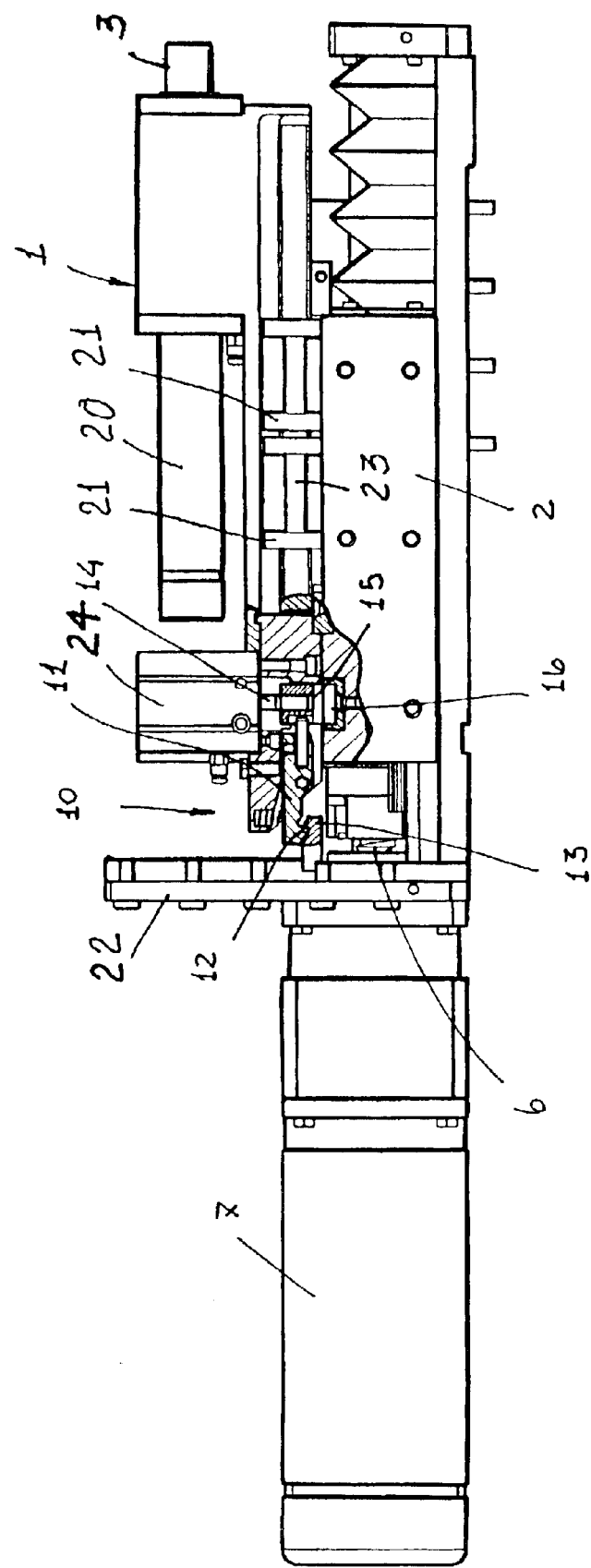
FIG. 3 illustrates, by a partial cross-sectional view and a side elevation view, a mandrel of the embodiment shown in FIG. 2, with clamping means for clamping the mandrel at a withdrawn or non working position.
Figure 4:
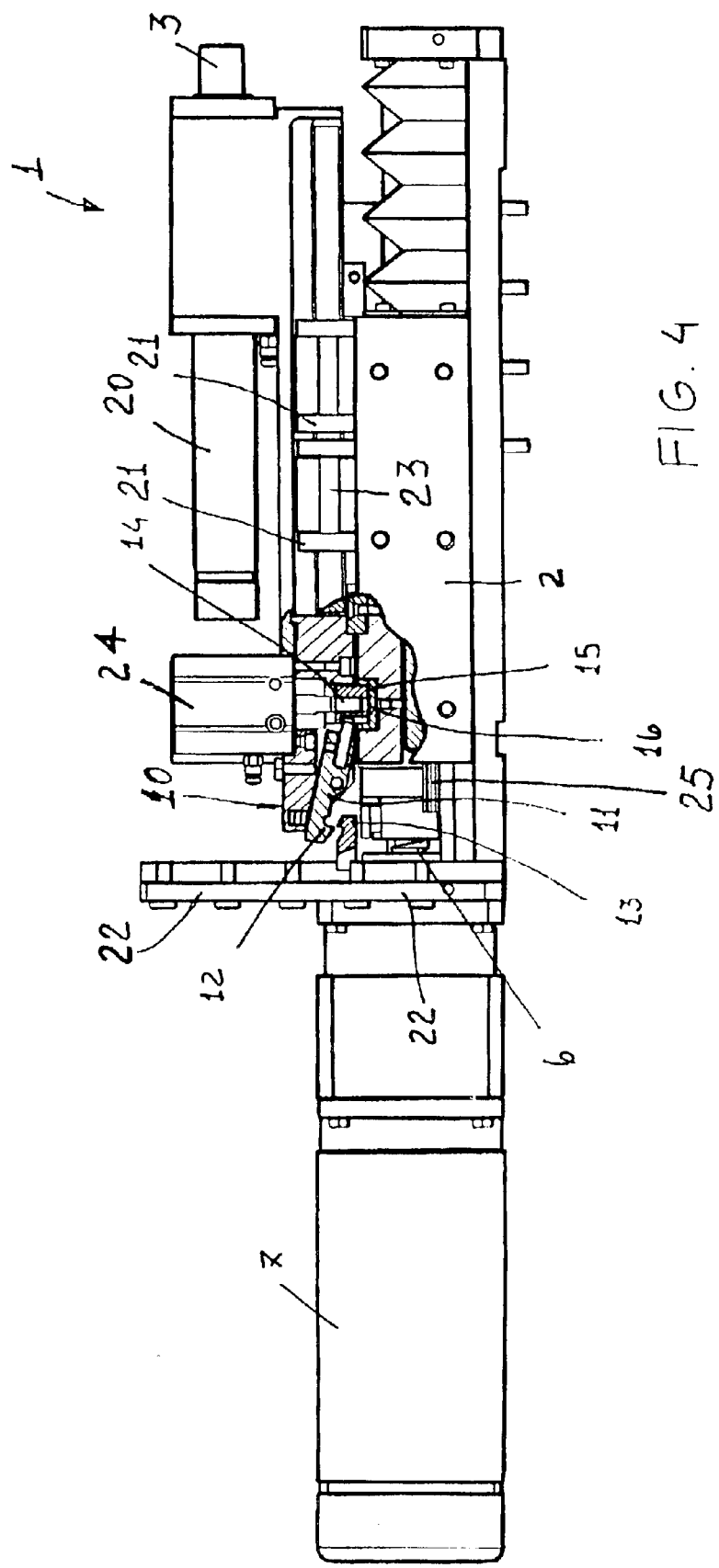
FIG. 4 is a side elevation view showing a mandrel with clamping means for removably clamping said mandrel at an unlatched position thereof, for allowing the mandrel to be advanced or fed.
Figure 5:
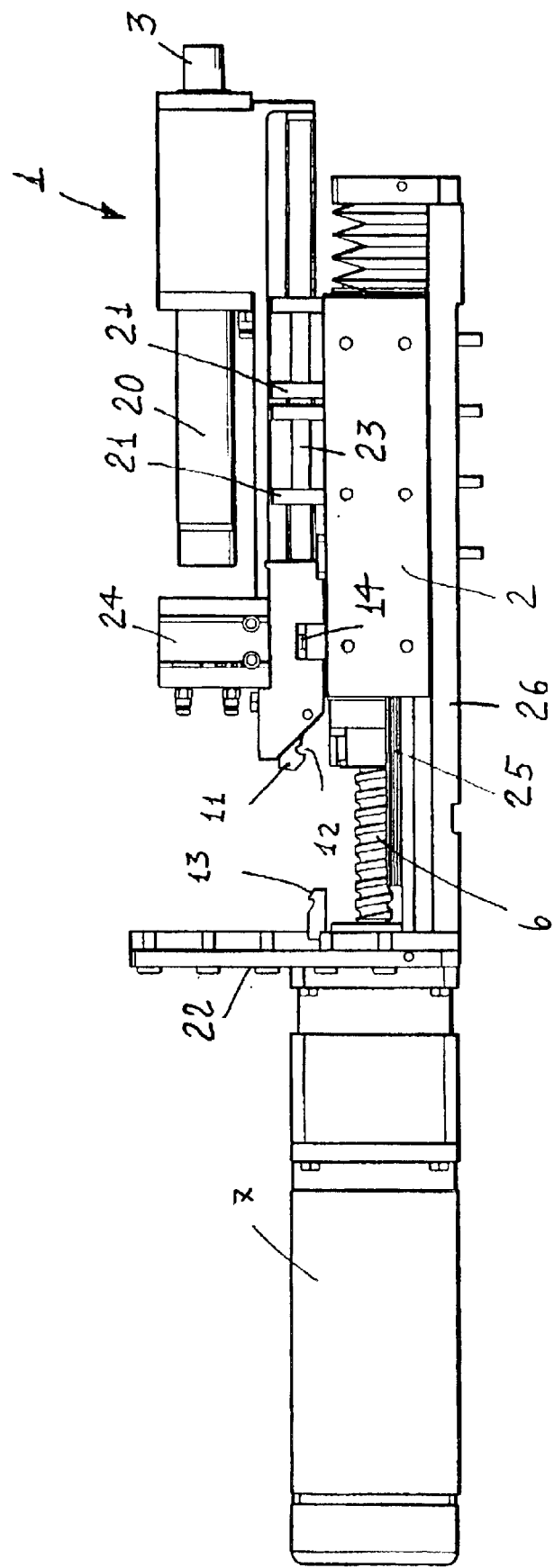
FIG. 5 is a further side elevation view illustrating a mandrel, as seen from a side thereof and at an advanced or fed forward position thereof.

On the spike element 11 operates a pushing piston 14, engaged in a cylinder 24, having an insertion element 15, provided for engaging in a seat 16 formed on the supporting carriage 2, thereby making the related mandrel 3 rigid in translation with the carriage 2, as shown in FIG. 3.

To achieve an unlocking position and for allowing each mandrel to be fed together with the carriage, said insertion piston 14 is operated.

The latter will engage the insertion element 15 in the recess 16, thereby coupling the carriage 2 and mandrel 3, and simultaneously causing the spike element 11 to swing, thereby disengaging the tooth 12 and counter-tooth 13.

Under these conditions, each selected mandrel 3 will be fed together with the carriage 2.

Driving means for individually driving the individual mandrel 3 are moreover provided, said driving means being adapted to be actuated with the respective mandrel at a fed forward or advanced position.

Said driving means comprise a brushless motor 20, of suitable power, allowing the mandrel 3 to be driven for drilling panels and other materials, such as wood, plastic material, aluminium and the like.

The rotary speed of each individual brushless motor 20 is variable, and being controlled by a specifically designed driving assembly.

Said speed can change from 0 to 15,000 rpm's. The driving assembly according to the present invention allows to eliminate mechanical transmission elements which, in prior art like driving assemblies, were used for simultaneously turning all the mandrels, with the problems thereinabove mentioned.

By the disclosed driving assembly, as an insertion piston 14 is driven, the spike element 11 is disengaged, thereby it is possible to drive the individual selected mandrel together with the carriage 2.

As, on the contrary, the piston 14 is deactuated, the tooth 12 of the spike element 11 will engage with the counter-tooth 13 coupled to the fixed wall, and the insertion element 15 will be disengaged from the seat 16.

Under these conditions, the feeding of the carriage 2 does not cause any feeding of a corresponding mandrel 3.

In this conditions, moreover, the not selected mandrels 3, through the tooth 12 of the spike element 11 will engage with the counter-tooth 13 and will be held anchored to the wall 22, as the carriage 2 advances.

This result can be obtained since the individual mandrels comprise respective rods 23 slidable on bushes 21 rigid with the supporting carriage 2.

Since the driving assembly according to the present invention comprises respective brushless motors 20, it affords the possibility of easily adjusting, at will, the driving speed of the several mandrels 3.

The invention, as disclosed, is susceptible to several modifications and variations, all of which will come within the scope of the inventive idea.

Moreover, all the constructional details can be replaced by other technically equivalent elements.

In practicing the invention, the used materials, as well as the contingent size and shapes, can be any, according to requirements.

What is claimed is:

1. A rectilinearly reciprocating driving assembly for driving a plurality of mandrels, comprising a sliding carriage supporting a plurality of mandrels, arranged in an adjoining relationship parallel to a driving direction of said carriage, said assembly comprising releasable holding means for removably holding, at a withdrawn position, individual mandrels, and driving means for driving said individual mandrels, said driving means being actuated as the mandrel is arranged at an advanced position, a worm screw engaging with said carriage and being driven by a feeding motor coupled to a fixed construction supporting said carriage, said carriage slidably supporting a plurality of adjoining mandrels which can slide along sliding directions substantially parallel to a carriage driving direction, said mandrels being driven by fixed stroke pneumatic selecting cylinders having cylinder sliding rods, said cylinders being designed for locking said rods at their end of stroke positions, the mandrels to be used being selected by causing said pneumatic cylinders to be fed-forward, each preselected cylinder causing a corresponding slidable supporting element to move along guides of said mandrels, to cause selected mandrels to frontward project from non-selected mandrels, said mandrels being independently driven by brushless electric motors, said assembly selectively driving all said brushless electric motors or some of said brushless electric motors with respect to selected mandrels while holding in a rest condition unused mandrels, said carriage being driven by a worm screw in turn driven by a motor reducing unit supported by a shoulder, said worm screw engaging with a corresponding female thread formed on a rear surface of said carriage, said mandrels sliding on supporting bushes rigid with said carriage and adapted to be locked, by a tooth element and a counter-tooth element to a fixed wall to which said motor-reducing unit is applied, and wherein said fixed wall comprises a hole in which is engaged said worm screw, a hook element coupled to said fixed wall and engaging with a clamping spike element having a tooth shaped end portion.

2. An assembly, according to claim 1, wherein said assembly further comprises, to selectively and independently drive a mandrel, with respect to another mandrel, holding means for removably holding, at a withdrawn position, individual mandrels, said holding means comprising a clamping spike element swingably mounted on a mandrel body and including a hook element removably engaging with a counter-hook element mounted on said fixed wall.

3. An assembly, according to claim 2, wherein said clamping spike element is operated by a pushing piston engaged in a cylinder, including an insertion element adapted to be inserted into a seat formed on said carriage for making a related mandrel rigid with said carriage, as said spike element is arranged at a locking position.

4. An assembly, according to claim 3, wherein said piston is driven for introducing an insertion element into said seat thereby making said carriage rigid with a said mandrel, while causing said clamping spike element to swing thereby disengaging the tooth element and counter-tooth element.

5. An assembly, according to claim 3, wherein said spike element is adapted to be disengaged for allowing a selected mandrel to translate together with said carriage.

6. An assembly, according to claim 3, wherein as said pushing piston is deactuated, the tooth element of said clamping spike element engages with the counter-tooth element coupled to said fixed wall and said insertion element is disengaged from said seat.

* * * * *